(12) United States Patent
Sudworth

(10) Patent No.: US 9,059,484 B2
(45) Date of Patent: Jun. 16, 2015

(54) RECHARGEABLE ELECTROCHEMICAL CELL AND METHOD OF MANUFACTURING A RECHARGEABLE ELECTROCHEMICAL CELL

(75) Inventor: James Lowe Sudworth, Burton Upon Trent (GB)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 655 days.

(21) Appl. No.: 12/855,919

(22) Filed: Aug. 13, 2010

(65) Prior Publication Data

US 2012/0040230 A1    Feb. 16, 2012

(51) Int. Cl.
*H01M 2/08*    (2006.01)
*H01M 10/39*    (2006.01)
(Continued)

(52) U.S. Cl.
CPC ............ *H01M 10/39* (2013.01); *Y10T 29/4911* (2015.01); *H01M 2/08* (2013.01); *H01M 2/365* (2013.01); *H01M 4/38* (2013.01); *H01M 10/399* (2013.01)

(58) Field of Classification Search
CPC ....... H01M 2/08; H01M 2/365; H01M 10/34; H01M 10/345; H01M 10/347; H01M 10/399
USPC .................. 429/131, 321; 29/623.2
See application file for complete search history.

(56) References Cited

U.S. PATENT DOCUMENTS 4,365,409 A    12/1982 Riley (Continued)

FOREIGN PATENT DOCUMENTS

| GB | 2208033 A | 2/1989 |
|---|---|---|
| GB | 2213311 A | 8/1989 |
| JP | 10255860 A | 9/1998 |

OTHER PUBLICATIONS

Saito et al. Ignition and extinguishment of sodium fires in air diluted by nitrogen. 5th Proceedings of AOSFST, 2001, pp. 285-294 [online], [retrieved on Aug. 19, 2013]. Retrieved from the Internet <URL: http://www.iafss.org/publications/aofst/5/285/view>.*
Search Report and Written Opinion from corresponding PCT Application No. PCT/US2011/042322 dated Feb. 24, 2012.
Eaglepicher, Thermal Battery Design.
Paolin, Lodi, and Shaffer, A Battery Management System for Sodium-Metal Chloride Batteries Used As Standby Backup Power in Telecommunication Applications.

(Continued)

*Primary Examiner* — Jonathan G Leong
*Assistant Examiner* — James Erwin
(74) *Attorney, Agent, or Firm* — GE Global Patent Operation; Peter T. DiMauro

(57) ABSTRACT

An electrochemical cell includes an outer casing defining at least a portion of an anode electrode chamber, an ionically conducting separator disposed within the outer casing, an inner surface of the separator defining a cathode electrode chamber, a cathode electrode disposed within the cathode chamber, a conductive current collecting body coupled with the cathode electrode, an alkali metal-containing electrolyte disposed in the cathode electrode chamber, and a sealing body coupled with the outer casing and sealing the anode electrode chamber from an external atmosphere disposed outside of the outer casing. The electrolyte supplies alkali metal through the separator to the anode electrode chamber in response to an electric charge applied to the conductive current collecting body. A first content of a gas component in the anode electrode chamber is in the anode electrode chamber in an amount that is less than an amount of a second content of the gas component in ambient air.

15 Claims, 5 Drawing Sheets

(51) Int. Cl.
  *H01M 2/36* (2006.01)
  *H01M 4/38* (2006.01)

(56) References Cited

U.S. PATENT DOCUMENTS

| | | | |
|---|---|---|---|
| 4,722,875 A | | 2/1988 | Wright |
| 4,772,293 A | * | 9/1988 | Bugden et al. ............... 29/623.1 |
| 2006/0222945 A1 | | 10/2006 | Bowden et al. |
| 2009/0011330 A1 | * | 1/2009 | Onodera et al. .............. 429/179 |
| 2010/0086834 A1 | * | 4/2010 | Mahalingam et al. .......... 429/51 |

OTHER PUBLICATIONS

Vallance and White, High-Temperature Sodium: Metal Chloride Storage Battery, Excerpt from the Proceedings of the COMSOL Conference, Boston, 2008.

Vallance and White, High-Temperature Sodium: Metal Chloride Storage Battery, Presentation from the Proceedings of the COMSOL Conference, Boston, 2008.

David Trickett, Current Status of Health and Safety Issues of Sodium/Metal Chloride (Zebra) Batteries, NREL/TP-460-25553, Nov. 1998.

* cited by examiner

RECHARGEABLE ELECTROCHEMICAL CELL AND METHOD OF MANUFACTURING A RECHARGEABLE ELECTROCHEMICAL CELL

BACKGROUND

1. Technical Field

The subject matter described herein relates to rechargeable electrochemical cells.

2. Discussion of Art

Some known rechargeable batteries, such as sodium metal chloride batteries, provide electric current and may be recharged based on chemical reactions occurring within one or more cells of the batteries. The cells may be referred to as electrochemical cells. The electrochemical cells may include a metal current collector or body that conveys electric current from the cell to power external electric loads and receives an electric charge to recharge the cell. A porous cathode electrode is disposed around the metal current collector. The cathode electrode may include sodium chloride. The metal current collector and the cathode electrode may be located within an ionically conducting tube. A sodium ion-conducting fluid electrolyte may be loaded into the ionically conducting tube and extends into the pores of the cathode electrode. An exterior casing encloses the cell with the cathode electrode, ionically conducting tube, and fluid electrolyte disposed within the exterior casing. An interior chamber is established between the exterior casing and the ionically conducting tube.

During discharge of electric current from the cell, the sodium metal gives up electrons and is oxidized to produce sodium ions, which pass through the ionically conducting tube and via the fluid electrolyte to the cathode electrode. The metal chloride accepts electrons and is reduced to metal and the sodium ions together with the released chloride ions from the metal chloride form sodium chloride. This reaction creates an electric potential in the cell that may be used to power external electric loads.

In order to charge the cell, a positive electric charge or current is applied to a positive terminal of the cell. The positive terminal is joined to the metal current collector such that the positive electric charge is conducted into the cathode electrode. The positive electric charge oxidizes the metal of the cathode electrode to a metal chloride and the sodium ions from sodium chloride in the interior chamber pass through the ionically conducting tube where they are reduced to sodium metal.

Known cells are hermetically sealed in ambient air at atmospheric pressure. As a result, the interior chambers include ambient air. The sodium that is collected in the interior chamber during charging of the cell can react with the oxygen in the air of the interior chamber, thereby leaving nitrogen. The remainder of the sodium generated during charge may act similar to a piston and compress the remaining nitrogen in the interior chamber. When the correct charging voltage is used to charge the cell, the amount of sodium generated from the cathode electrode is sufficiently small to avoid overly compressing the gas in the interior chamber. If an incorrect charging voltage is used, such as when a malfunctioning charge control device applies too large of a charging voltage, additional sodium may be generated within the cell. For example, additional sodium may be electrolyzed from the sodium-containing electrolyte in the cathode electrode compartment. This additional sodium can increase the pressure of the gas in the interior chamber. For example, relatively small compression of nitrogen gas in the interior chamber may result in significant increases in the pressure inside the interior chamber.

If the pressure inside the interior chamber increases too much, the ionically conducting tube can break and allow the sodium in the interior chamber to react with the cathode electrode. This reaction can cause the cell to heat up and further increase the gas pressure. The increased gas pressure can cause the outer casing of the cell to rupture.

It may be desirable to have a cell and/or energy storage device that differs from those that are currently available.

BRIEF DESCRIPTION

In one embodiment of the subject matter described herein, an electrochemical cell is provided. The cell includes: an outer casing defining at least a portion of an anode electrode chamber; an ionically conducting separator disposed within the outer casing, an inner surface of the separator defining a cathode electrode chamber with the anode electrode chamber extending from the outer casing to an outer surface of the separator, a first content of a gas component in the anode electrode chamber being present in the anode electrode chamber in an amount that is less than an amount of a second content of the gas component in ambient air; a cathode electrode disposed within the cathode electrode chamber; a conductive current collecting body coupled with the cathode electrode; an alkali metal-containing electrolyte disposed in the cathode electrode chamber, the electrolyte capable of supplying alkali metal through the separator to the anode electrode chamber in response to an electric charge applied to the conductive current collecting body; and a sealing body coupled with the outer casing and sealing the anode electrode chamber from an external atmosphere disposed outside of the outer casing.

In another embodiment, a method of manufacturing a rechargeable electrochemical cell is provided. The cell includes an ionically conducting separator within an outer casing of the electrochemical cell, the outer casing having an inner surface defining an anode electrode chamber that is further defined by an outer surface of the separator, and an inner surface of the separator defining a cathode electrode chamber, a cathode disposed within the cathode electrode chamber, and a conductive current collecting body electrically coupled with the cathode. The method includes: loading an alkali metal-containing electrolyte into the cathode electrode chamber, the electrolyte capable of providing alkali metal to the anode electrode chamber through the separator in response to an electric charge applied to the conductive current collecting body; reducing a component content of gas disposed in the anode electrode chamber relative to an external atmosphere disposed outside of the outer casing; and sealing the anode electrode chamber from the external atmosphere while the component content of gas in the anode electrode chamber is relatively reduced.

In another embodiment, a rechargeable electrochemical cell is provided. The cell includes an ionically conducting separator disposed within an outer casing, a cathode electrode disposed within the ionically conducting separator, and a conductive current collecting body coupled with the cathode electrode, the outer casing defining an anode electrode chamber between the ionically conducting separator and the outer casing. The cell is manufactured according to the following method: loading an alkali metal-containing electrolyte into the ionically conducting separator between the cathode electrode and the ionically conducting separator, the alkali metal-containing electrolyte providing an alkali metal that is collected in the anode electrode chamber when an electric charge is applied to the conductive current collecting body; reducing a component content of gas disposed in the anode electrode chamber; and sealing the anode electrode chamber from an external atmosphere disposed outside of the outer casing while the component content of the gas in the anode electrode chamber is reduced.

DETAILED DESCRIPTION

The subject matter described herein relates to rechargeable electrochemical cells, and to methods of manufacturing rechargeable electrochemical cells. As used herein, "component content of gas" refers to one of a plurality of gases that together are referred to as a "gas"; for example, atmospheric air contains about 78% nitrogen, 21% oxygen, and the remainder being a mix of other gases with argon being a predominant example. The major component content of gas as applied to air, then, would be the nitrogen constituent. For ease of illustration, nitrogen is useful as a non-limiting example of a constituent or component content of gas. In a similar manner, sodium is a useful non-limiting example of an alkali metal.

Figure 1:
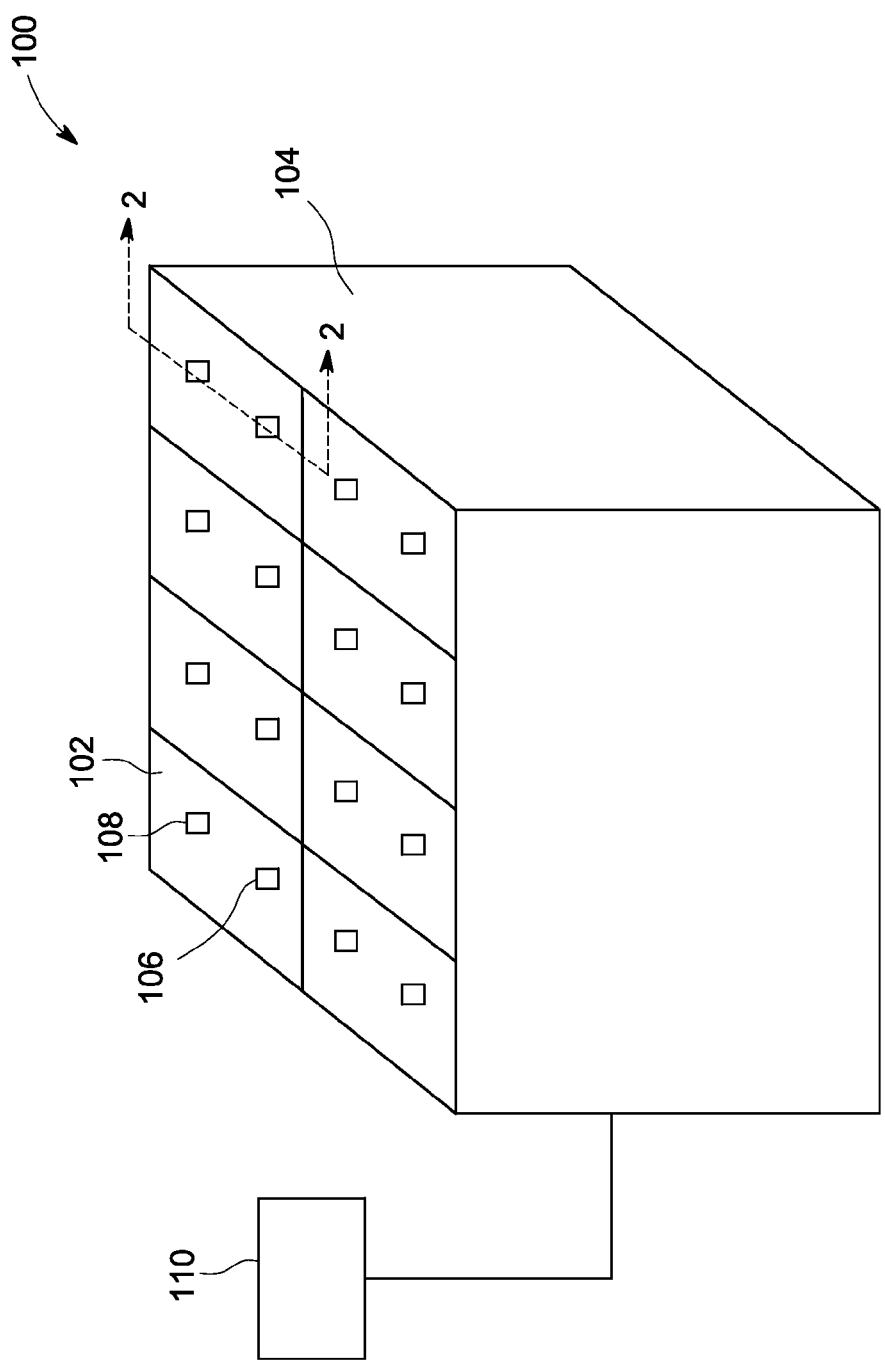
FIG. 1 is a perspective view of a battery assembly in accordance with one embodiment.

FIG. 1 is a perspective view of a battery assembly 100 in accordance with one embodiment. The battery assembly 100 includes several electrochemical cells 102 disposed within a housing 104. The number of electrochemical cells 102 shown in FIG. 1 is provided merely as an illustration and is not intended to be limiting. The electrochemical cells 102 are rechargeable molten salt electrochemical cells. For example, the electrochemical cells 102 include a molten salt, such as sodium chloroaluminate, as an electrolyte. The electrochemical cells 102 may be referred to as sodium-containing electrochemical cells and the battery assembly 100 may be referred to as a sodium-containing battery. In one embodiment, the battery assembly 100 may be a battery that includes several of the electrochemical cells 102.

The electrochemical cells 102 include positive and negative terminals 106, 108. The positive and negative terminals 106, 108 are conductive bodies joined to the electrochemical cells 102 and that are used to convey electric current from the electrochemical cells 102 to an electric load. For example, each electrochemical cell 102 may generate a voltage potential between or across the positive and negative terminals 106, 108. The positive and negative terminals 106, 108 of the electrochemical cells 102 may be connected in series to increase the total current obtained from the battery assembly 100.

The positive and negative terminals 106, 108 also may be used to charge the electrochemical cells 102 once the energy stored in the electrochemical cells 102 has been at least partially depleted. For example, after use of the battery assembly 100, the energy stored in the electrochemical cells 102 may be consumed by electric loads that are powered by the battery assembly 100. The electrochemical cells 102 may be electrically connected in series with each other and with a charging module 110. The charging module 110 applies an electric charge, such as electric current, into the electrochemical cells 102 through the positive and negative terminals 106, 108 to recharge the electrochemical cells 102 so that the battery assembly 100 can again provide electric current to the electric load.

Figure 2:
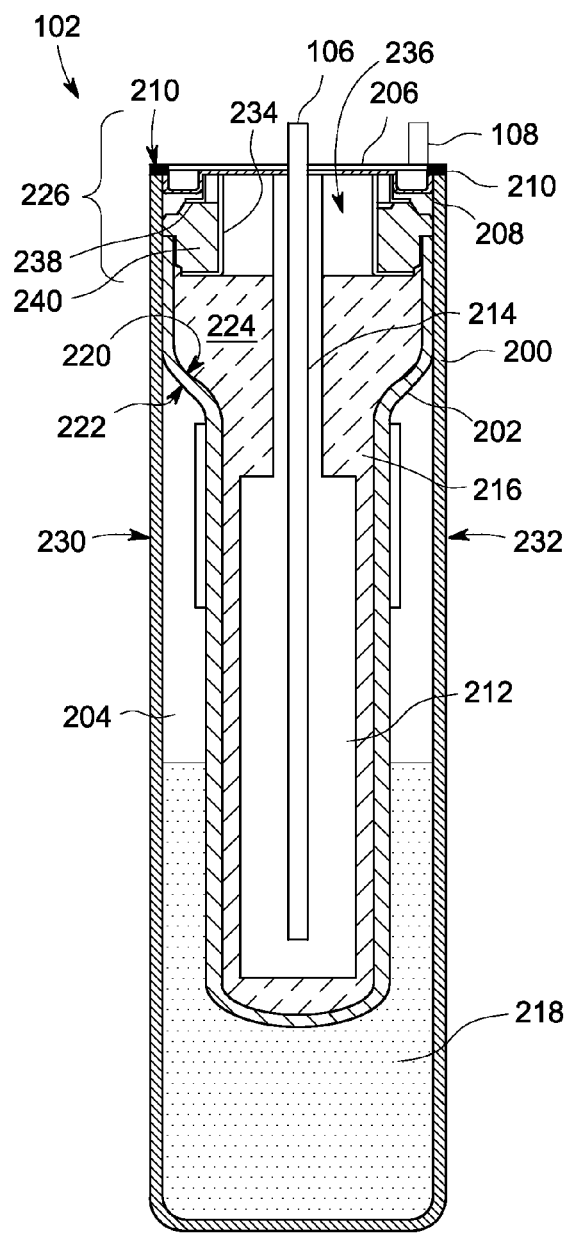
FIG. 2 is a cross-sectional view of a rechargeable electrochemical cell of the battery shown in FIG. 1 along line 2-2 (also shown in FIG. 1) in accordance with one embodiment.

FIG. 2 is a cross-sectional view of one of the electrochemical cells 102 along line 2-2 shown in FIG. 1 in accordance with one embodiment. The electrochemical cell 102 includes an outer casing 200 with an ionically conducting separator 202 disposed therein. The outer casing 200 may define the exterior housing of the electrochemical cell 102 that separates the electrochemical cell 102 from other electrochemical cells 102. When the electrochemical cells 102 are connected in series, an electrically insulating separator may be provided between the neighboring or adjacent electrochemical cells 102. The outer casing 200 may include or be formed from a metal, such as nickel, a nickel alloy, or steel. The outer casing 200 defines at least a portion of an anode electrode chamber 204. In the illustrated embodiment, the anode electrode chamber 204 includes the volume or space inside the electrochemical cell 102 that extends between the outer casing 200 and the ionically conducting separator 202.

The ionically conducting separator 202 is a body that physically separates interior volumes or chambers of the electrochemical cell 102. In one embodiment, the ionically conducting separator 202 is a tubular body that forms an electrolyte membrane of the electrochemical cell 102. For example, the ionically conducting separator 202 may be a beta-alumina solid electrolyte (BASE) formed from β-alumina or β"-alumina. The ionically conducting separator 202 includes an inner surface 220 and an opposite outer surface 222. The ionically conducting separator 202 prevents chemical reactions between constituents on opposite sides of the surfaces 220, 222 while permitting alkali metal ions to be conducted through the ionically conducting separator 202 from the inner surface 220 to the outer surface 222, and from the outer surface 222 to the inner surface 220. The inner surface 220 defines a cathode electrode chamber 224. The cathode electrode chamber 224 is separated from the anode electrode chamber 204 by the ionically conducting separator 202.

A cathode electrode 212 is disposed within the ionically conducting separator 202. The cathode electrode 212 may be a porous body that includes or is formed from a metal material. The cathode electrode 212 may be formed from metal chloride or chlorinated metal, such as $FeCl_2$ or $NiCl_2$, or a mixture of chlorinated metals. In another example, the cathode electrode 212 may be formed from a porous metal that includes nickel, iron, and/or aluminum. A conductive current collecting body 214 is partially disposed within and coupled with the cathode electrode 212. The conductive current collecting body 214 includes a metal, such as nickel and/or copper. The cathode electrode 212 may be formed by packing the metal of the cathode electrode 212 in powder form around the conductive current collecting body 214. A portion of the conductive current collecting body 214 may protrude from the electrochemical cell 102 and form the positive terminal 106 of the electrochemical cell 102.

A sealing structure 226 encloses the top portion of the electrochemical cell 102 in the embodiment shown in FIG. 2. The sealing structure 226 includes an inner collar 234, an outer collar 238, and an intermediate collar 240. The cross-sections of the inner and outer collars 234, 238 have approximate "L" shapes. The intermediate collar 240 extends between the inner and outer collars 234, 238. The intermediate collar 240 may include or be formed from an electrically insulative or dielectric material to electrically separate the inner and outer collars 234, 238. In the illustrated embodiment, the inner collar 234 is coupled with a cap enclosure 206. The inner and outer collars 234, 238 encircle the conductive current collecting body 214 in the view shown in FIG. 2.

The sealing structure 226 also includes a sealing body 208. The sealing body 208 may be coupled with the outer collar 238. In the illustrated embodiment, the sealing body 208 is a ring that at least partially extends around an outer periphery of the electrochemical cell 102. While the sealing body 208 is shown as a ring, alternatively the sealing body 208 may have a different shape. The sealing body 208 partially extends from outer edges 230, 232 of the electrochemical cell 102 toward the conductive current collecting body 214 in the view shown in FIG. 2.

The sealing structure 226 separates the anode electrode chamber 204 from the cathode electrode chamber 224 inside the electrochemical cell 102. For example, the anode electrode chamber 204 may be bounded by the outer casing 230, the ionically conducting separator 202, the intermediate collar 240, the outer collar 238, and the sealing body 208. The cathode electrode chamber 224 may be bounded by the ionically conducting separator 202, the inner collar 234, and the cap enclosure 206. The inner collar 234 defines a passageway 236 into the cathode electrode chamber 224. The negative terminal 108 is attached to the sealing body 208 in the illustrated embodiment. The cap enclosure 206 may be electrically coupled with the inner collar 234 and electrically isolated or separated from the outer collar 238.

A fluid electrolyte 216 is disposed in the ionically conducting separator 202. The electrolyte 216 may be a liquid or molten material that includes sodium. In one embodiment, the electrolyte 216 is formed from sodium chloroaluminate or sodium tetrachloroaluminate ($NaAlCl_4$). The electrolyte 216 may extend into the porous cathode electrode 212 and be disposed around the cathode electrode 212 between the cathode electrode 212 and the ionically conducting separator 202. The cathode electrode 212 may be saturated with the electrolyte 216.

A fluid anode material 218 is disposed within the anode electrode chamber 204. The fluid anode material 218 may be a liquid or molten material that includes an alkali constituent. For example, the fluid anode material 218 may include or be formed from liquid sodium. The ionically conducting separator 202 separates the fluid anode material 218 from the fluid electrolyte 216 located within the ionically conducting separator 202. The fluid anode material 218 may be electrically coupled with the negative terminal 108 by the outer casing 200.

During discharge of current from the electrochemical cell 102, ions from the fluid anode material 218 are conducted to reaction sites at the interface between the cathode electrode 212 and the fluid electrolyte 216 by the ionically conducting separator 202. The ions may be ions of an alkali metal, such as sodium. The ions may form an alkali metal chloride with the chloride ions released when the metal chloride of the cathode electrode 212 is reduced by the electrons supplied through the conductive current collecting body 214. The reduction of the metal chloride material creates an electric potential in the electrochemical cell 102. For example, the reduction of the material of the cathode electrode 212 may create an electric current that is conducted through the cathode electrode 212 to the conductive current collecting body 214 and the positive terminal 106. The ions continue to flow from the fluid anode material 218 to the cathode electrode 212 as current continues to be drawn from the electrochemical cell 102. The amount of fluid anode material 218 in the anode electrode chamber 204 reduces as more ions flow from the fluid anode material 218 to the cathode electrode 212. In one embodiment, this chemical reaction that occurs during discharge of the electrochemical cell 102 may be represented as:

$$MCl_2 + 2Na \rightarrow M + 2NaCl \qquad \text{(Discharge Reaction)}$$

where M represents a metal or metal alloy in the cathode electrode 212, Cl represent chlorine of the metal in the cathode electrode 212, and Na represents the sodium obtained from the fluid anode material 218. Alternatively, Na may represent another alkali metal of the fluid anode material 218.

In order to charge the electrochemical cell 102, the depleted alkali of the fluid anode material 218 may need to be replenished. A positive electric charge or current is applied to the positive terminal 106 and is conducted into the cathode electrode 212 by the conductive current collecting body 214. The positive electric charge or current causes a reverse reaction relative to the discharge reaction. For example, instead of consuming ions of an alkali metal such as sodium, the positive electric charge or current generates ions of the alkali metal by reacting the metal of the chlorinated metal of the cathode electrode 212 with the a chlorinated metal, such as sodium chloride (NaCl), in the cathode electrode 212 that is generated by the Discharge Reaction. The ions of the alkali metal that are generated by the charge reaction are transferred or collected in the anode electrode chamber 204 by passing through the ionically conducting separator 202. In one embodiment, this reaction may be represented as:

$$M + 2NaCl \rightarrow 2Na + MCl_2 \qquad \text{(Charge Reaction)}$$

The electrochemical cell 102 is charged when all or substantially all of the chlorinated alkali metal in the cathode electrode 212 is consumed according to the Charge Reaction. For example, the electrochemical cell 102 may be fully charged when all or substantially all of the sodium chloride (NaCl) in the cathode electrode 212 is consumed. In one embodiment, the electrochemical cell 102 may be fully charged when the electric charge applied to the positive terminal 106 is approximately 45 amp-hours (Ah). If the electrochemical cell 102 is overcharged, alkali metals such as sodium in the fluid electrolyte 216 may be electrolyzed or separated from the fluid electrolyte 216 and passed into the anode electrode chamber 204 through the ionically conducting separator 202. For example, if a voltage is applied to the positive terminal 106 that exceeds a predetermined threshold voltage of the electrochemical cell 102, additional alkali ions can be separated from the fluid electrolyte 216 and added to the fluid anode material 218. In one embodiment, the alkali metal that is electrolyzed from the fluid electrolyte 216 is sodium and the sodium ions are separated from the fluid electrolyte 216 when a voltage above 2.75 volts is applied to the positive terminal 106.

The additional alkali metal ions that are transferred into the anode electrode chamber 204 can be reduced to sodium metal and thus increase the pressure inside the anode electrode chamber 204 if a sufficient amount of gas is present in the anode electrode chamber 204. In order to prevent the pressure inside the anode electrode chamber 204 from increasing too much and causing rupture or failure of the outer casing 200, the anode electrode chamber 204 may have a component content of the gas in the anode electrode chamber 204 that is lower than the component content of the gas in ambient air, or the atmosphere surrounding the electrochemical cell 102 and/or the battery assembly 100 (shown in FIG. 1). For example, the nitrogen content of the gas in the anode electrode chamber 204 may be lower than the nitrogen content of ambient air.

The component content of the gas in the anode electrode chamber 204 may be reduced relative to the same component content in ambient air in several different ways. In one embodiment, the component content of the gas in the anode electrode chamber 204 is reduced relative to ambient air by sealing the anode electrode chamber 204 within an environment of reduced pressure, or under a vacuum.

Figure 3:
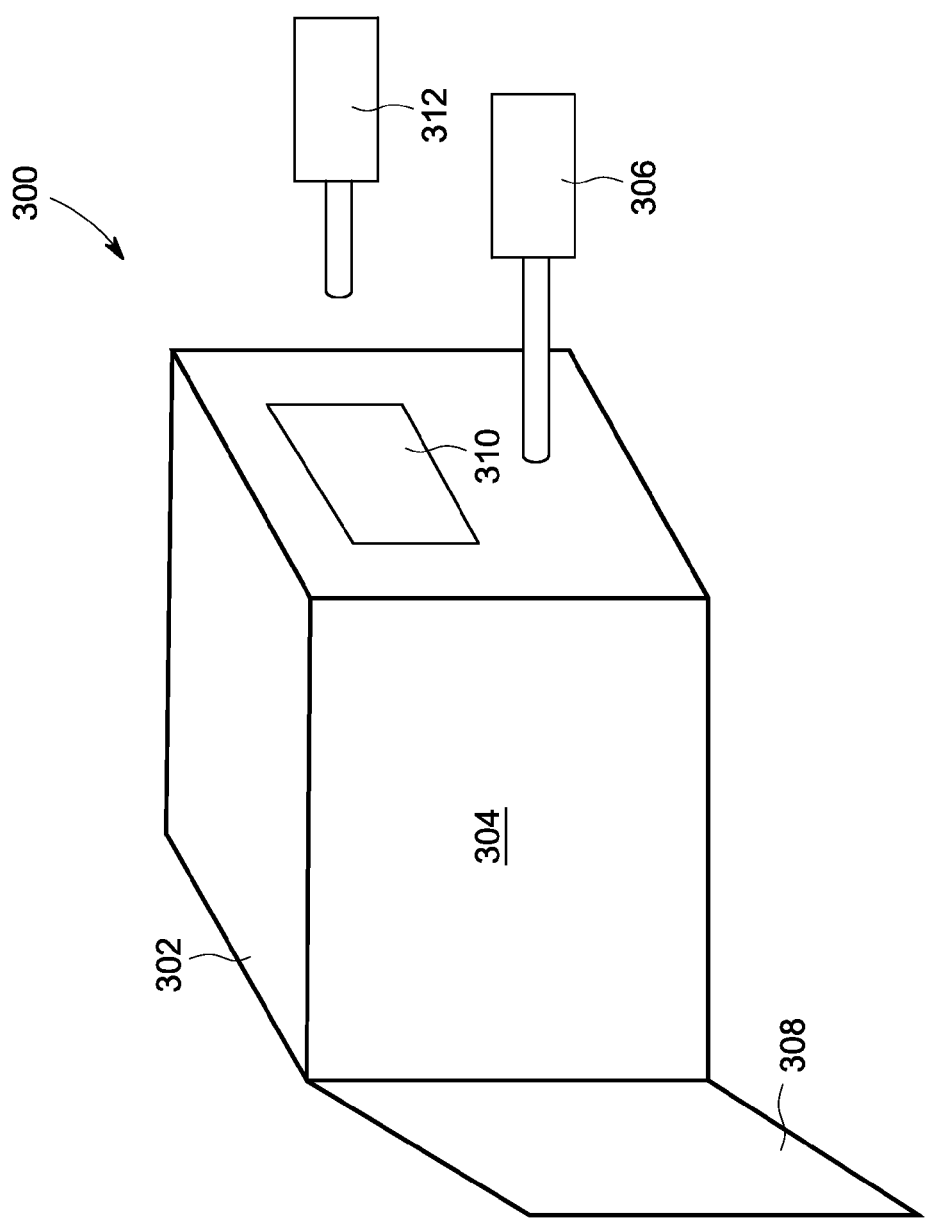
FIG. 3 is an illustration of a vacuum welding chamber in accordance with one embodiment.

FIG. 3 is an illustration of a vacuum welding chamber 300 in accordance with one embodiment. The vacuum welding chamber 300 includes an exterior housing 302 that surrounds an interior volume 304. The interior volume 304 is fluidly coupled with a vacuum pump 306. For example, the vacuum pump 306 may be coupled with the housing 302 and configured to draw air from the interior volume 304. The housing 302 includes a door 308 that may be opened to insert the electrochemical cell 102 (shown in FIG. 1) into the housing 302. The door 308 is closed to seal the interior volume 304 from the ambient air surrounding the housing 302. In the illustrated embodiment, the housing 302 includes a light transmissive window 310. The window 310 permits focused beams of energy, such as a laser light, to pass through the housing 302 into the interior volume 304.

Prior to sealing the anode electrode chamber 204 (shown in FIG. 2) of the electrochemical cell 102 (shown in FIG. 1), the outer casing 200 (shown in FIG. 2) and the ionically conducting separator 202 (shown in FIG. 2) are placed inside the interior volume 304. The door 308 is closed to seal the interior volume 304 and the pump 306 is activated to pump out at least some of the air in the interior volume 304. As the air is pumped out of the interior volume 304, at least some of the air is removed from the anode electrode chamber 204. The pump 306 reduces the air pressure in the interior volume 304 and the anode electrode chamber 204 below the air pressure of ambient air, or below atmospheric pressure of approximately 1 bar (or 100 kiloPascals). The pump 306 may reduce the pressure in the interior volume 304 and the anode electrode chamber 204 to lower pressure such as 50 millibar (or 5000 Pascals) or lower. Alternatively, the pump 306 may reduce the pressure in the interior volume 304 and the anode electrode chamber 204 to a lower pressure, such as 5 millibar (or 500 Pascals). In another embodiment, the pressure in the interior volume 304 and the anode electrode chamber 204 is reduced to at least 0.001 millibar (or 1 Pascal) or lower. As another example, the pressure may be reduced to at least 0.00001 millibar (or 0.00133 Pascals) or lower.

As the pressure in the anode electrode chamber 204 (shown in FIG. 2) is reduced, the amount of one or more component contents of the gas in the anode electrode chamber 204 also is reduced. For example, the percentage of volume or mass of nitrogen in the gas in the anode electrode chamber 204 may be reduced relative to the percentage of volume or mass of nitrogen in ambient air. Once the pressure is reduced and the component content of the gas in the anode electrode chamber 204 is reduced, a source of focused energy, such as a laser light source 312, is used to seal the anode electrode chamber 204. The laser light source 312 emits a focused beam of energy, such as a laser light, into the interior volume 304 through the window 310. As shown in FIG. 3, the source of focused energy, that is, the laser light source 312, is located outside of the vacuum welding chamber 300 while the outer casing 200 (shown in FIG. 2) and the ionically conducting separator 202 (shown in FIG. 2) are placed inside the vacuum welding chamber 300. The focused beam of energy may be used to weld the sealing structure 226 (shown in FIG. 2), such as the sealing body 208 (shown in FIG. 2), to the outer casing 200 within the reduced pressure atmosphere of the interior volume 304. For example, the focused beam of energy may locally melt adjoining or abutting surfaces of the sealing body 208 and the outer casing 200 to couple the sealing body 208 to the outer casing 200 and seal the anode electrode chamber 204 from the ambient air. In one embodiment, the sealing body 208 is coupled with the interior sealing body 234 (shown in FIG. 2) prior to reducing the pressure inside the anode electrode chamber 204 and welding the sealing body 208 to the outer casing 200.

Figure 4:
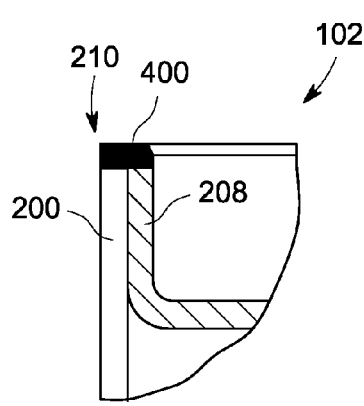
FIG. 4 is a detail view of an upper edge of the electrochemical cell shown in FIG. 1 in accordance with one embodiment.

FIG. 4 is a detail view of one of the upper edges 210 of the electrochemical cell 102 in accordance with one embodiment. As shown in the detail view of FIG. 4, the sealing body 208 engages the outer casing 200. In one embodiment, the laser light is emitted from the laser light source 312 (shown in FIG. 3) toward the interface between the sealing body 208 and the outer casing 200 The energy of the laser light may be large enough to locally melt the sealing body 208 and the outer casing 200. The laser light source 312 stops emitting the laser light or reduces the energy of the laser light to permit the melted areas to cool and solidify. Once the melted areas have solidified, a welded joint 400 is formed at the interface between the sealing body 208 and the outer casing 200

The sealing body 208 may extend around an outer upper perimeter of the electrochemical cell 102. For example, the sealing body 208 may be in the shape of a square, rectangle, circle, or other shape that encircles the positive terminal 106, 108 (shown in FIG. 1) of the electrochemical cell 102. Alternatively, the sealing body 208 may only extend around a portion of the upper perimeter of the electrochemical cell 102. Formation of the welded joint 400 may seal the interior volumes of the electrochemical cell 102 from an external atmosphere located outside of the electrochemical cell 102. By "external atmosphere," it is intended to mean that the welded joint 400 seals the interior of the electrochemical cell 102 from the space or volume surrounding the electrochemical cell 102, whether the space or volume includes ambient air or is a vacuum environment.

The welded joint 400 seals the electrochemical cell 102 such that matter disposed within the anode electrode chamber 204 (shown in FIG. 2) of the electrochemical cell 102 cannot pass through the interface between the sealing body 208 and the outer casing 200 and/or the sealing body 208 and the interior sealing body 234 (shown in FIG. 2) to the ambient air. Similarly, the welded joint 400 may seal the anode electrode chamber 204 to prevent the ambient air from passing through the interface between the sealing body 208 and the outer casing 200 body 208 to the interior volumes of the electrochemical cell 102, such as the anode electrode chamber 204.

The welded joint 400 may be the final or last weld that is formed to seal or enclose the anode electrode chamber 204 (shown in FIG. 2) of the electrochemical cell 102. For example, prior to creating the welded joint 400, the anode electrode chamber 204 may be substantially enclosed or sealed from the external atmosphere but for the interface between the sealing body 208 and the outer casing 200. The anode electrode chamber 204 may be open to the ambient air outside of the electrochemical cell 102 until the welded joint 400 is formed. Forming the welded joint 400 inside the vacuum welding chamber 300 (shown in FIG. 3) under an atmosphere having a reduced component content, such as of nitrogen, reduces the component content in the anode electrode chamber 204 and prevents nitrogen or other gases from passing into the anode electrode chamber 204.

Reducing the component content of the gas in the anode electrode chamber 204 may reduce the pressure that is created in the anode electrode chamber 204 when alkali metal ions are reduced to sodium and collected in the anode electrode chamber 204 during charging of the electrochemical cell 102. For example, the electrochemical cell 102 may be overcharged by applying too large of a charging voltage or current to the positive terminal 106 (shown in FIG. 1). Overcharging the electrochemical cell 102 may cause additional alkali metal ions, such as sodium ions, in the fluid electrolyte 216 (shown in FIG. 2) to be electrolyzed, or separated, from the fluid electrolyte 216. The additional alkali metal ions from the fluid electrolyte 216 may pass through the ionically conducting separator 202 (shown in FIG. 2) and collected in the anode electrode chamber 204 along with the alkali metal ions that are obtained from the cathode electrode 212 (shown in FIG. 2) during the charging reaction described above. As the amount of alkali metal ions collected in the anode electrode chamber 204 as the fluid anode material 218 (shown in FIG. 2) increases, there is less volume for the gas in the anode electrode chamber 204. Reducing one or more component contents of the gas of the anode electrode chamber 204 can reduce the pressure that is built up inside the anode electrode chamber 204 by the increasing amount of fluid anode material 218. As the increase in pressure in the anode electrode chamber 204 is reduced relative to electrochemical cells 102 that have larger amounts of component contents of the gas in the anode electrode chamber 204 (such as nitrogen), there is less risk that the outer casing 200 (shown in FIG. 2) will rupture or burst due to the increase in pressure.

Figure 5:
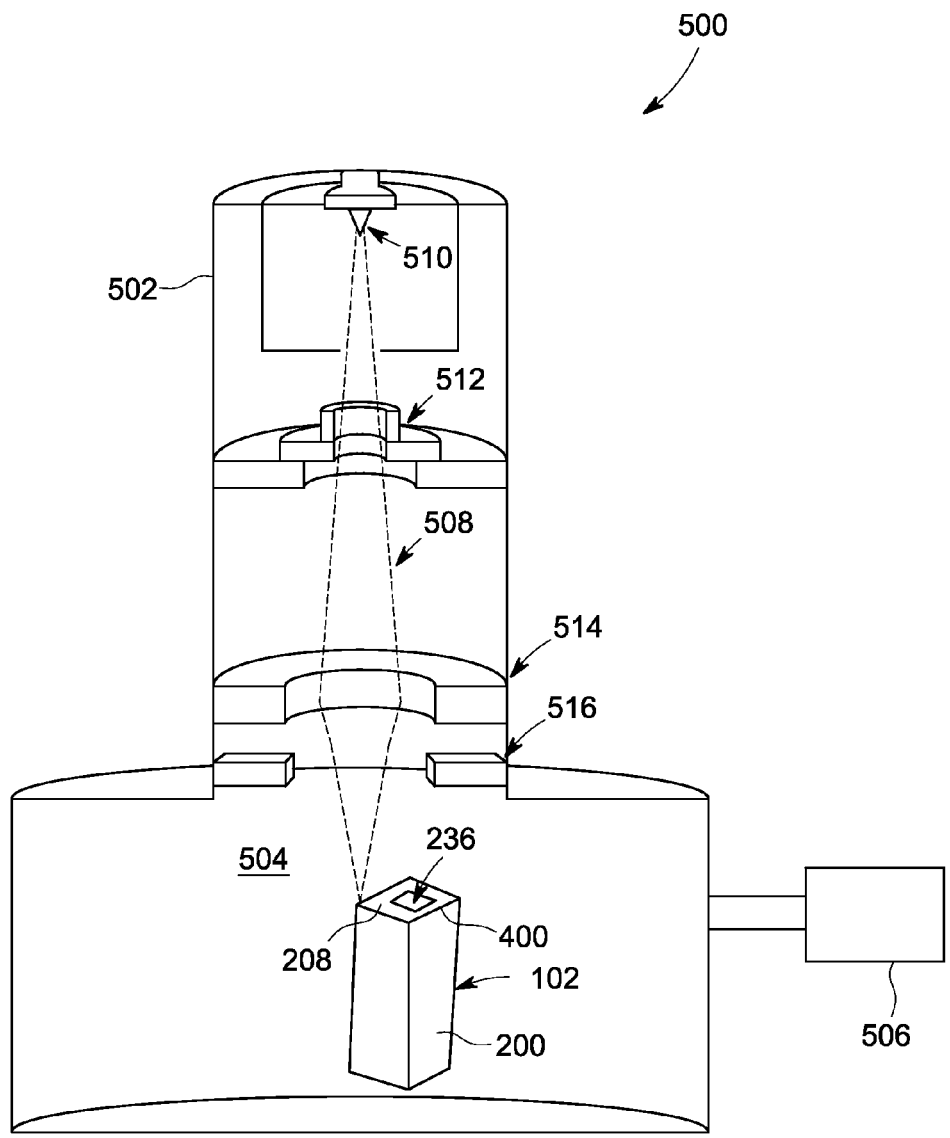
FIG. 5 is an illustration of a vacuum welding chamber in accordance with another embodiment.

FIG. 5 is an illustration of a vacuum welding chamber 500 in accordance with another embodiment. Similar to the vacuum welding chamber 300 (shown in FIG. 3), the vacuum welding chamber 500 may be used to form the welded joint 400 on the electrochemical cell 102 to seal the anode electrode chamber 204 (shown in FIG. 2) with a component content of the gas in the anode electrode chamber 204 that is reduced relative to the ambient air. By way of example only, the nitrogen content within the anode electrode chamber 204 may be less than 78% by volume of the anode electrode chamber 204. In another example, the nitrogen content may be less than 1%, less than 0.1%, or less than 0.01% in the anode electrode chamber 204 after the welded joint 400 is formed.

The vacuum welding chamber 500 includes an exterior housing 502 that surrounds an interior volume 504. The interior volume 504 is fluidly coupled with a vacuum pump 506 and is configured to draw air from the interior volume 504 to create a low pressure or vacuum environment inside the interior volume 504. For example, prior to sealing the anode electrode chamber 204 (shown in FIG. 2) of the electrochemical cell 102, the electrochemical cell 102 is placed inside the interior volume 504 and the pump 506 reduces the pressure in the interior volume 504 and the anode electrode chamber 204 to a relatively low pressure, such as 50 millibarr (or 5000 Pascals) or less. Alternatively, the pump 506 may reduce the pressure in the interior volume 504 and the anode electrode chamber 204 to a lower pressure.

The vacuum welding chamber 500 is an electron beam chamber that directs a focused beam of energy, such as an electron beam 508, or e-beam, toward the electrochemical cell 102 to form the welded joint 400 (shown in FIG. 4). The vacuum welding chamber 500 includes an incandescent cathode 510 and a primary anode 512 that receive a relatively large potential difference to generate the e-beam 508. In the view shown in FIG. 5, the e-beam 508 is directed in a general downward direction toward the electrochemical cell 102. In one embodiment, a plurality of electromagnets 514, 516 generate magnetic fields that focus the e-beam 508 onto the interface between the outer casing 200 and the sealing body 208 to form the welded joint 400. For example, the e-beam 508 may locally heat and melt the interface between the sealing body 208 and the outer casing 200 to create the welded joint 400. The cathode electrode 212 (shown in FIG. 2), the conductive current collecting body 214 (shown in FIG. 2), and the fluid electrolyte 216 (shown in FIG. 2) may be loaded into the ionically conducting separator 202 (shown in FIG. 2) through the passageway 236. The cap enclosure 206 may then be coupled with the inner collar 234 (shown in FIG. 2) to enclose the passageway 236.

In another embodiment, an alkali metal-reactive material is loaded into the anode electrode chamber 204 (shown in FIG. 2). For example, prior to sealing the anode electrode chamber 204 from the ambient air, a sodium-reactive material, such as carbon dioxide gas, may be loaded into the anode electrode chamber 204. The alkali metal-reactive material may be injected into the anode electrode chamber 204. Alternatively, the electrochemical cell 102 may be placed into the vacuum welding chamber 300 or 500 (shown in FIGS. 3 and 5) and the vacuum welding chamber 300 or 500 may be substantially filled with the alkali metal-reactive material. The alkali metal-reactive material can flow into the anode electrode chamber 204 prior to creating the welded joint 400. After the welded joint 400 is created, the alkali metal-reactive material may react with at least some of the alkali metal collected in the anode electrode chamber thus consuming the alkali reactive material and reducing pressure or creating a vacuum inside the anode electrode chamber 204.

Figure 6:
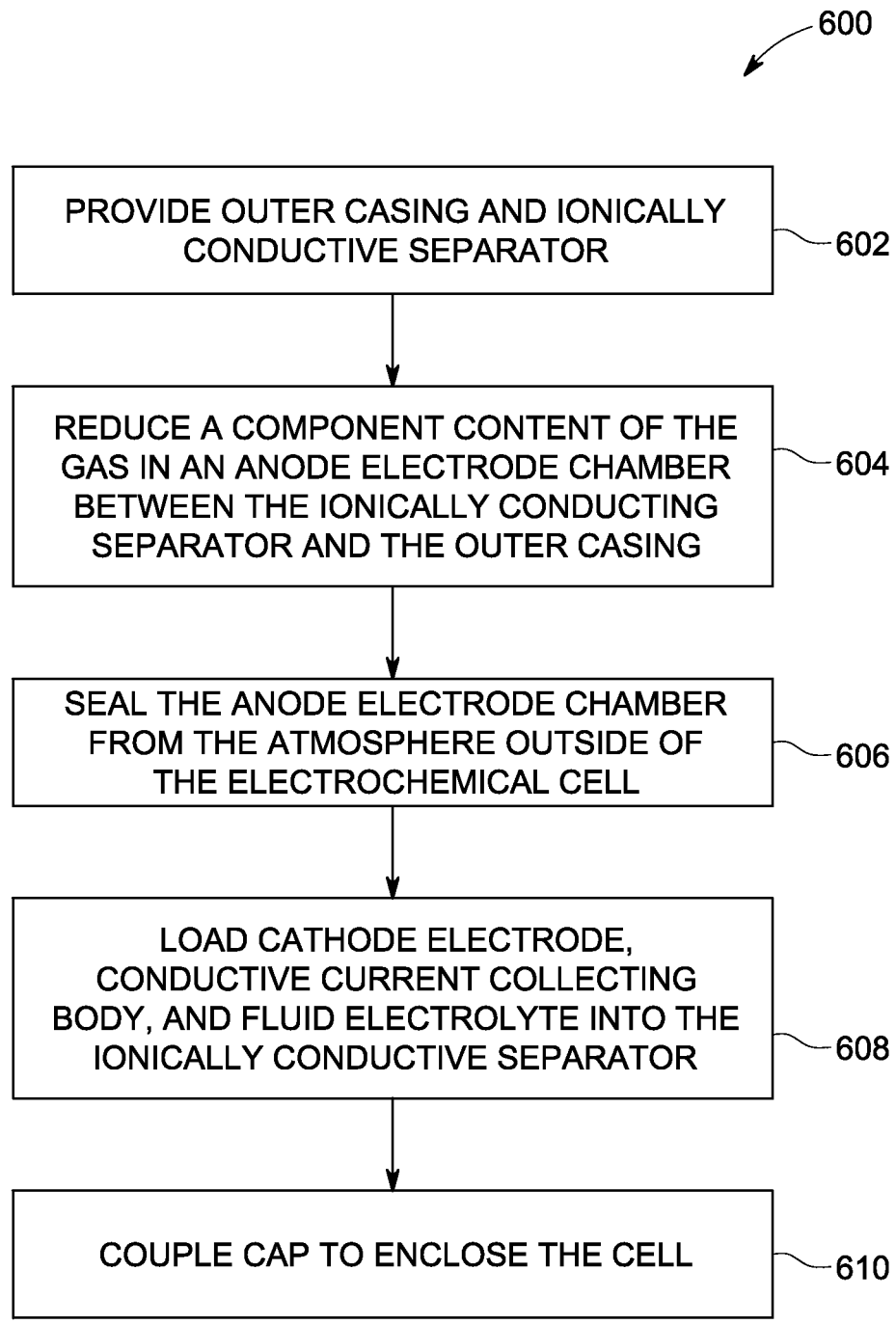
FIG. 6 is a flowchart for a method of manufacturing a rechargeable electrochemical cell in accordance with one embodiment.

FIG. 6 is a flowchart for a method 600 of manufacturing a rechargeable electrochemical cell in accordance with one embodiment. The method 600 may be used to manufacture the electrochemical cell 102 (shown in FIG. 1).

At 602, an outer casing and ionically conducting separator are provided. For example, the outer casing 200 and ionically conducting separator 202 (shown in FIG. 2) may be provided. The ionically conducting separator 202 is located within the outer casing 200 such that the anode electrode chamber 204 (shown in FIG. 2) is formed between the ionically conducting separator 202 and the outer casing 200.

At 604, a component content of the gas in the anode electrode chamber of the electrochemical cell is reduced. For example, the outer casing 200, ionically conducting separator 202, fluid electrolyte 216, cathode electrode 212, and conductive current collecting body 214 (all shown in FIG. 2) may be placed into the vacuum welding chamber 300 or 500 (shown in FIGS. 3 and 5). The air pressure in the vacuum welding chamber 300, 500 may be reduced relative to the ambient air outside of the vacuum welding chamber 300, 500. Reducing the air pressure may reduce one or more component contents in the gas of the anode electrode chamber 204. For example, the nitrogen content of the anode electrode chamber 204 may be less than the nitrogen content of the ambient air.

At 606, the anode electrode chamber of the electrochemical cell is sealed. For example, anode electrode chamber 204 (shown in FIG. 2) may be bounded by one or more of the outer collar 238, the intermediate collar 240, the ionically conducting separator 202, the outer casing 200, and the sealing body 208 (all shown in FIG. 2). Prior to 606, the anode electrode chamber 204 may be substantially sealed except for the interface between the outer casing 200 and the sealing body 208. The welded joint 400 (shown in FIG. 4) may be formed between the sealing body 208 and the outer casing 200 in order to seal the anode electrode chamber 204. The welded joint 400 encloses the anode electrode chamber 204 while the anode electrode chamber 204 and the electrochemical cell 102 are located in a reduced pressure or vacuum atmosphere. The welded joint 400 may be formed in the reduced pressure or vacuum atmosphere to seal the anode electrode chamber 204. The electrochemical cell 102 may then be removed from the vacuum welding chamber 300, 500 (shown in FIGS. 3 and 5). The welded joint 400 seals the anode electrode chamber 204 from the atmosphere surrounding the electrochemical cell 102, such as the ambient air, and prevents one or more component contents of the ambient air from entering into the anode electrode chamber 204.

At 608, a cathode electrode, conductive current collecting body, and a fluid alkali metal-containing electrolyte are loaded into the ionically conducting separator. For example, after coupling the sealing body 208 (shown in FIG. 2) to the outer casing 200 (shown in FIG. 2) to seal the anode electrode chamber 204 (shown in FIG. 2), the cathode electrode 212 (shown in FIG. 2), conductive current collecting body 214 (shown in FIG. 2), and the fluid electrolyte 216 (shown in FIG. 2) may be loaded into the cathode electrode chamber 224 through the passageway 236 (shown in FIG. 2).

At 610, one or more cap enclosures are joined to the electrochemical cell to enclose the interior chambers of the electrochemical cell from the external atmosphere. For example, the cap enclosure 206 (shown in FIG. 2) may be joined with the inner collar 234 (shown in FIG. 2).

In another embodiment of the method 600, alkali metal-reactive material is loaded into the anode electrode chamber. For example, in addition to or in place of reducing one or more component contents of the gas in the anode electrode chamber at 606, an alkali metal-reactive material, such as carbon dioxide gas, is loaded into the anode electrode chamber. The alkali metal-reactive material may be injected into the anode electrode chamber 204 (shown in FIG. 2) or may be loaded into the anode electrode chamber 204 by filling in the vacuum welding chamber 300 or 500 (shown in FIGS. 3 and 5) with the alkali metal-reactive material prior to sealing the anode electrode chamber 204. The alkali metal-reactive material may be disposed in the anode electrode chamber 204 to react with and consume at least some of the alkali metal ions that are collected in the anode electrode chamber 204 due to overcharging of the electrochemical cell 102 (shown in FIG. 1). The reaction between the alkali metal-reactive material and the alkali metal may reduce pressure and/or create a vacuum in the anode electrode chamber 204.

In one embodiment of the subject matter described herein, an electrochemical cell is provided. The cell includes: an outer casing defining at least a portion of an anode electrode chamber; an ionically conducting separator disposed within the outer casing, an inner surface of the separator defining a cathode electrode chamber with the anode electrode chamber extending from the outer casing to an outer surface of the separator, a first content of a gas component in the anode electrode chamber being present in the anode electrode chamber in an amount that is less than an amount of a second content of the gas component in ambient air; a cathode electrode disposed within the cathode electrode chamber; a conductive current collecting body coupled with the cathode electrode; an alkali metal-containing electrolyte disposed in the cathode electrode chamber, the electrolyte capable of supplying alkali metal through the separator to the anode electrode chamber in response to an electric charge applied to the conductive current collecting body; and a sealing body coupled with the outer casing and sealing the anode electrode chamber from an external atmosphere disposed outside of the outer casing.

In another aspect, a first air pressure in the anode electrode chamber is less than a second air pressure of the ambient air.

In another aspect, the electrochemical cell further comprises an alkali metal-reactive material in the anode electrode chamber.

In another aspect, the electrochemical cell further comprises a welded joint coupling the sealing body to the outer casing.

In another embodiment, a method of manufacturing a rechargeable electrochemical cell is provided. The cell includes an ionically conducting separator within an outer casing of the electrochemical cell, the outer casing having an inner surface defining an anode electrode chamber that is further defined by an outer surface of the separator, and an inner surface of the separator defining a cathode electrode chamber, a cathode disposed within the cathode electrode chamber, and a conductive current collecting body electrically coupled with the cathode. The method includes: loading an alkali metal-containing electrolyte into the cathode electrode chamber, the electrolyte capable to provide alkali metal to the anode electrode chamber through the separator in response to an electric charge applied to the conductive current collecting body; reducing a component content of gas disposed in the anode electrode chamber relative to an external atmosphere disposed outside of the outer casing; and sealing the anode electrode chamber from the external atmosphere while the component content of gas in the anode electrode chamber is relatively reduced.

In another aspect, the component content is a first nitrogen content and the reducing step comprises reducing the first nitrogen content of the gas to a concentration that is less than a second nitrogen content of ambient air.

In another aspect, the reducing step comprises reducing a pressure relative to ambient air proximate to the outer casing in a chamber that is capable of achieving or maintaining the pressure that is reduced relative to ambient air.

In another aspect, the reducing step includes reducing an air pressure in the anode electrode chamber and the sealing step includes welding a sealing body to the outer casing while the air pressure is reduced.

In another aspect, the reducing step includes reducing the air pressure to 5000 Pascals or less.

In another aspect, the sealing step includes welding the anode electrode chamber closed using a focused beam of energy.

In another aspect, the focused beam of energy is an electron beam.

In another aspect, the focused beam of energy is a laser light.

In another aspect, the method further comprises loading an alkali metal-reactive material into the anode electrode compartment and the sealing step includes sealing the alkali metal-reactive material in the anode electrode chamber.

In another embodiment, a rechargeable electrochemical cell is provided. The cell includes an ionically conducting separator disposed within an outer casing, a cathode electrode disposed within the ionically conducting separator, and a conductive current collecting body coupled with the cathode electrode, the outer casing defining an anode electrode chamber between the ionically conducting separator and the outer casing. The cell is manufactured according to the following method: loading an alkali metal-containing electrolyte into the ionically conducting separator between the cathode electrode and the ionically conducting separator, the alkali metal-containing electrolyte providing an alkali metal that is collected in the anode electrode chamber when an electric charge is applied to the conductive current collecting body; reducing a component content of gas disposed in the anode electrode chamber; and sealing the anode electrode chamber from an external atmosphere disposed outside of the outer casing while the component content of the gas in the anode electrode chamber is reduced.

In another aspect, the component content is a first nitrogen content and the reducing step comprises reducing the first nitrogen content of the gas to a concentration that is less than a second nitrogen content of the ambient air.

In another aspect, the reducing step includes placing the ionically conducting separator, the outer casing, the cathode electrode, and the conductive current collecting body in a chamber having a pressure that is reduced relative to ambient air.

In another aspect, the reducing step includes reducing an air pressure in the anode electrode chamber and the sealing step includes welding a sealing body to the outer casing while the air pressure is reduced.

In another aspect, the sealing step includes welding the anode electrode chamber closed using a focused beam of energy.

In another aspect, the electrochemical cell comprises an alkali metal-reactive material in the anode electrode compartment.

In another aspect, the anode electrode chamber is sealed using at least one of an electron beam or a laser light.

The foregoing summary, as well as the following detailed description of certain embodiments of the presently described subject matter, will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosed subject matter without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the described subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the described subject matter, including the best mode, and also to enable any person skilled in the art to practice the embodiments of subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrochemical cell comprising:
   an outer casing defining at least a portion of an anode electrode chamber that includes a fluid anode material, wherein a gas pressure in the anode electrode chamber is 5000 Pascals or less and at least 500 Pascals;
   an ionically conducting separator disposed within the outer casing and defining a cathode electrode chamber inside the ionically conducting separator, the ionically conducting separator separating the cathode electrode chamber from the anode electrode chamber that is outside of the ionically conducting separator;
   a cathode electrode disposed within the cathode electrode chamber;
   a conductive current collecting body coupled with the cathode electrode;
   an alkali metal-containing electrolyte disposed in the cathode electrode chamber in the outer casing, the electrolyte capable of supplying, alkali metal through the ionically conducting separator in the outer casing to the anode electrode chamber in response to an electric charge applied to the conductive current collecting body; and
   a sealing body coupled with the outer casing and sealing the anode electrode chamber from an external atmosphere disposed outside of the outer casing.

2. The electrochemical cell of claim 1, wherein the fluid anode material includes an alkali metal-reactive material in the anode electrode chamber.

3. The electrochemical cell of claim 1, comprising a welded joint coupling the sealing body to the outer casing.

4. A method of manufacturing the electrochemical cell of claim 1, the method comprising:
   reducing a component content of gas disposed in an anode electrode chamber that is inside an outer casing of a rechargeable electrochemical cell such that a gas pressure inside the anode electrode chamber is 5000 Pascals or less and at least 500 Pascals; and
   sealing the anode electrode chamber from external atmosphere disposed outside of the outer casing while the gas pressure in the anode electrode chamber is 5000 Pascals or less and at least 500 Pascals.

5. The method of claim 4, wherein the component content is a first nitrogen content and the first nitrogen content of the gas is reduced to a concentration that is less than a second nitrogen content of ambient air.

6. The method of claim 4, wherein the component content of the gas disposed in the anode electrode chamber is reduced by sealing the outer casing and the anode electrode chamber in a vacuum welding chamber that is capable of achieving or maintaining the gas pressure that is reduced relative to ambient air, reducing the gas pressure to 5000 Pascals or less and at least 500 Pascals in the vacuum welding chamber, and emitting a focused beam of energy into the vacuum welding chamber to seal the anode electrode chamber.

7. The method of claim 4, wherein the anode electrode chamber is sealed by welding a sealing body to the outer casing while the gas pressure in the anode electrode chamber is reduced.

8. The method of claim 4, wherein the anode electrode chamber is sealed by welding the anode electrode chamber using the focused beam of energy.

9. The method of claim 8, wherein the focused beam of energy is an electron beam.

10. The method of claim 8, wherein the focused beam of energy is a laser light.

11. The method of claim 4, further comprising loading an alkali metal-reactive material into the anode electrode compartment and the alkali metal-reactive material is sealed in the anode electrode chamber.

12. A method of manufacturing the electrochemical cell of claim 1, the method comprising:
   placing an outer casing having an anode electrode chamber of a rechargeable electrochemical cell inside a vacuum welding chamber;
   closing the vacuum welding chamber from ambient air surrounding the vacuum welding chamber;
   reducing pressure inside the vacuum welding chamber and in the anode electrode chamber below ambient pressure; and
   emitting a beam of energy into the vacuum welding chamber to seal the outer casing of rechargeable electrochemical cell, wherein the outer casing is sealed such that the pressure inside the anode electrode chamber remains below ambient pressure.

13. The method of claim 12, wherein emitting the beam of energy welds a sealing body to the outer casing such that the anode electrode chamber is sealed inside the outer casing.

14. The method of claim 12, wherein the pressure inside the vacuum welding chamber is reduced to 5000 Pascals or less such that the pressure in the anode electrode chamber remains at 5000 Pascals or less after the outer casing is sealed.

15. The method of claim 12, wherein the pressure inside the vacuum welding chamber is reduced to 500 Pascals or more.

* * * * *